(12) United States Patent
Lumbatis et al.

(10) Patent No.: US 10,848,985 B2
(45) Date of Patent: Nov. 24, 2020

(54) STATION STEERING BASED UPON COMPUTED CHANNEL IMPACT

(71) Applicant: ARRIS Enterprises LLC, Suwanee, GA (US)

(72) Inventors: Kurt Alan Lumbatis, Dacula, GA (US); Jay Strater, San Diego, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 5 days.

(21) Appl. No.: 16/111,671

(22) Filed: Aug. 24, 2018

(65) Prior Publication Data

US 2019/0069188 A1 Feb. 28, 2019

Related U.S. Application Data

(60) Provisional application No. 62/552,683, filed on Aug. 31, 2017.

(51) Int. Cl.
*H04W 24/02* (2009.01)
*H04L 12/26* (2006.01)
(Continued)

(52) U.S. Cl.
CPC ............. *H04W 24/02* (2013.01); *H04L 43/16* (2013.01); *H04W 28/08* (2013.01); *H04W 48/16* (2013.01); *H04W 48/20* (2013.01); *H04W 84/12* (2013.01)

(58) Field of Classification Search
CPC ..... H04W 24/02; H04W 28/08; H04W 48/16; H04W 48/20; H04W 84/12; H04W 36/32; H04W 36/24; H04W 36/38; H04W 36/0072; H04W 76/11; H04W 84/105; H04W 36/0094; H04W 72/0453; H04W 12/08; H04W 36/20; H04W 12/1202; H04W 4/70; H04W 28/0236; H04W 36/0055; H04W 36/0083; H04W 4/30; H04W 36/36; H04W 4/02; H04W 72/082; H04W 84/045; H04W 4/80; H04W 4/029;
(Continued)

(56) References Cited

U.S. PATENT DOCUMENTS 9,253,662 B1 * 2/2016 Marupaduga ......... H04W 24/02
2010/0054137 A1 * 3/2010 Deng ................... H04B 7/2606
370/247

(Continued)

OTHER PUBLICATIONS

PCT International Search Report & Written Opinion, Re: Application No. PCT/US2018/047917, dated Nov. 21, 2018.

*Primary Examiner* — Hardikkumar D Patel
(74) *Attorney, Agent, or Firm* — Wenderoth, Lind & Ponack, L.L.P.

(57) ABSTRACT

Methods, systems, and computer readable media may be operable to facilitate station steering based upon computed channel impact. A channel impact of moving a station to one or more different link points within a WLAN may be calculated, and based upon the calculated channel impacts, the station may be steered to a certain link point. Using the calculated channel impacts, one or more stations may be selected for removal from an overloaded link point, a new link point may be selected for association with a station, and a determination may be made whether other WLAN changes may cause a backhaul or fronthaul channel utilization to exceed a corresponding threshold.

20 Claims, 6 Drawing Sheets

(51) Int. Cl.
*H04W 48/20* (2009.01)
*H04W 48/16* (2009.01)
*H04W 28/08* (2009.01)
*H04W 84/12* (2009.01)

(58) Field of Classification Search
CPC ............... H04W 36/16; H04W 36/245; H04W 28/0289; H04W 16/26; H04W 80/06; H04W 4/023; H04W 8/005; H04W 48/02; H04W 12/00503; H04W 92/20; H04W 40/246; H04W 88/08; H04W 72/1231; H04W 12/00502; H04W 28/18; H04W 88/10; H04W 84/18; H04W 76/15; H04W 72/04; H04W 72/02; H04W 76/02; H04W 76/14; H04W 72/1215; H04W 72/1226; H04W 76/16; H04W 88/06; H04W 24/10; H04W 36/08; H04W 24/08; H04W 88/14; H04W 16/18; H04W 84/047; H04W 72/085; H04W 76/18; H04W 36/03; H04W 36/14; H04W 36/12; H04W 48/00; H04W 4/06; H04W 84/20; H04W 36/22; H04W 52/00; H04W 88/00; H04W 28/0231; H04W 28/0252; H04W 28/0257; H04W 28/0263; H04L 43/16; H04L 12/4633; H04L 43/0888; H04L 67/303; H04L 5/003; H04L 43/0864; H04L 43/08; H04L 41/12; H04L 45/02; H04L 63/061; H04L 63/0435; H04L 5/0037; H04L 9/0855; H04L 2001/0092; H04L 2001/0093; H04L 2001/0094; H04L 2001/0095; H04L 2001/0096; H04L 2001/0097; H04B 1/005; H04B 17/345; H04B 17/318; H04B 1/713; H04B 17/0085; H04B 2001/7154; H04B 7/0452; H04B 7/024; H04B 3/52; H04B 3/58; H04B 3/46; H04B 10/29; G01S 5/0294; G01S 5/0289; G01S 19/46; G08B 13/2494; H01P 3/16; H01P 3/10

See application file for complete search history.

(56) References Cited

U.S. PATENT DOCUMENTS

| | | | |
|---|---|---|---|
| 2013/0223324 A1* | 8/2013 | Somasundaram | H04W 16/26 370/315 |
| 2015/0223160 A1* | 8/2015 | Ho | H04W 72/0453 370/338 |
| 2017/0208502 A1 | 7/2017 | Ho et al. | |
| 2018/0103408 A1* | 4/2018 | Amini | H04B 1/005 |
| 2018/0279192 A1* | 9/2018 | Raissinia | H04W 36/38 |

* cited by examiner

STATION STEERING BASED UPON COMPUTED CHANNEL IMPACT

CROSS REFERENCE TO RELATED APPLICATION

This application is a non-provisional application claiming the benefit of U.S. Provisional Application Ser. No. 62/552,683, entitled "Method Utilizing Computed and Estimated Channel Impact for WLAN Extender/Repeater STA Steering Decisions," which was filed on Aug. 31, 2017, and is incorporated herein by reference in its entirety.

TECHNICAL FIELD

This disclosure relates to station steering based upon computed channel impact.

BACKGROUND

Typically, an access point such as a gateway device may provide a plurality of services to a customer premise, and the plurality of services may be provided through a wired interface and/or wireless communications passed between the access point and one or more client devices or stations. One or more network extenders (e.g., extenders, repeaters, etc.) may be installed within a customer premise to expand the range of a wireless network that is provided by an access point.

A WLAN (wireless local area network) deployment may include multiple link points (e.g., access points, network extenders, repeaters, etc.). The WLAN may comprise an extended service set (ESS), wherein repeaters and/or network extenders are present either via a WLAN or LAN (local area network) link. It is desirable to understand the total impact of a station as the station moves across the various link points.

BRIEF DESCRIPTION OF THE DRAWINGS

Like reference numbers and designations in the various drawings indicate like elements.

DETAILED DESCRIPTION

Methods, systems, and computer readable media may be operable to facilitate station steering based upon computed channel impact. A channel impact of moving a station to one or more different link points within a WLAN may be calculated, and based upon the calculated channel impacts, the station may be steered to a certain link point. Using the calculated channel impacts, one or more stations may be selected for removal from an overloaded link point, a new link point may be selected for association with a station, and a determination may be made whether other WLAN changes may cause a backhaul or fronthaul channel utilization to exceed a corresponding threshold.

Figure 1:
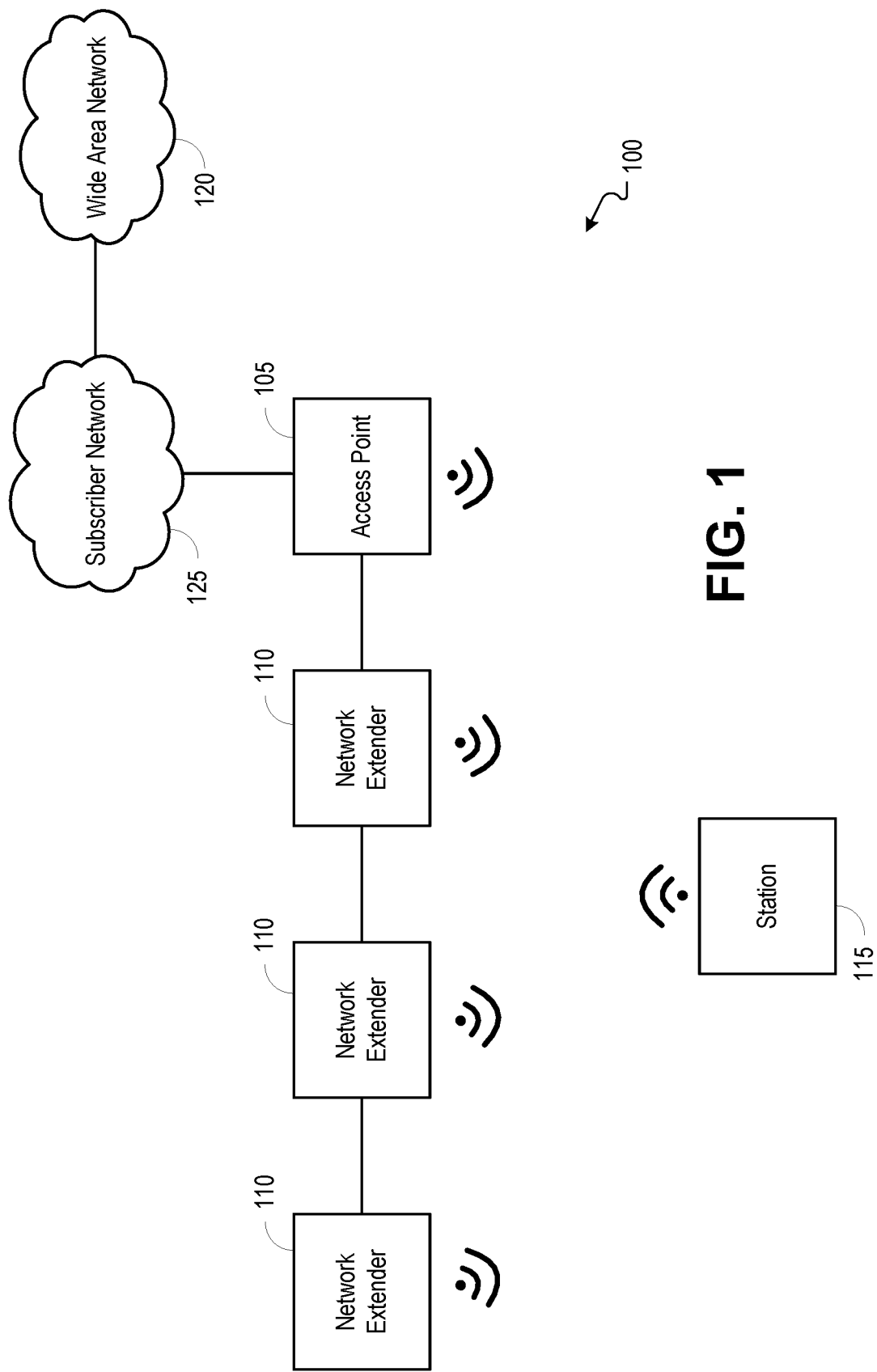
FIG. 1 is a block diagram illustrating an example network environment operable to facilitate station steering based upon computed channel impact.

FIG. 1 is a block diagram illustrating an example network environment 100 operable to facilitate station steering based upon computed channel impact. In embodiments, a local network (e.g., a WLAN) may include one or more link points. The local network may include a deployment of link points comprising an extended service set (ESS), and the link points may be interconnected via a WLAN and/or LAN link. The link points may include one or more access points 105 and one or more network extenders 110. It should be understood that the network extenders 110 may include extender devices and/or repeater devices. In embodiments, an access point 105 may route communications to and from the one or more network extenders 110 and/or one or more stations 115. For example, the one or more network extenders 110 and/or one or more stations 115 may be provisioned to receive video service(s), data service(s), and/or voice services through the access point 105. In embodiments, an access point 105 may include a gateway, a cable modem, a wireless router including an embedded cable modem, a mobile hot-spot router, a multimedia over coaxial alliance (MoCA) node, and any other device that is operable to route communications to and from a network extender 110 and/or station (STA) 115.

In embodiments, stations 115 may include a wide variety of devices such as televisions, mobile devices, tablets, set-top boxes, computers, and any other device that is capable of utilizing a video, data, or telephony service. In embodiments, an access point 105 may provide one or more service sets, and the service sets may be identified using unique service set identifiers (SSID). Service sets may be used for delivering traffic between the access point 105 and the network extenders 110 and/or station 115, and each service set may be designated for a particular service (e.g., video, data, security, hotspot, etc.). In embodiments, the station 115 may identify a service set and may connect to a service set provided by the access point 105.

In embodiments, a network extender 110 may be associated with an access point 105, and the network extender 110 may facilitate the delivery of multiple services to one or more stations 115. The one or more network extenders 110 may be configured with network parameters of the associated access point 105, thereby extending the range of a wireless network provided by the access point 105. For example, a network extender 110 may be configured with SSID(s), passwords/passphrases, and various other wireless parameter information associated with the access point 105. It will be appreciated by those skilled in the relevant art that a channel of communication may be established between the access point 105 and a network extender 110 using any of a variety of communication technologies (e.g., MoCA, 802.11, G.hn, HomePlug AV (HPAV), HPAV2, Bluetooth, Zigbee, Zwave, etc.).

Once connected to a service set provided by the access point 105 or network extender 110, a station 115 may receive content and/or services from upstream networks or servers (e.g., wide area network (WAN) 120), and may communicate with other stations 115 connected to the same service set. For example, communications between stations 115 and an access point 105 or network extender 110 may include wireless communications (e.g., 802.11 packet exchanges).

In embodiments, an access point 105 may route communications between one or more stations 115 and a wide area network (WAN) 120 via a subscriber network 125. The subscriber network 125 may include various networks such as coaxial cable, optical fiber, twisted pair network, wireless networks including 4G and LTE, and others.

In embodiments, one or more network extenders 110 may be connected to an access point 105 via a multimedia over coax alliance (MoCA) connection or any other physical medium used for communication (e.g., MoCA, 802.11, G.hn, HomePlug AV (HPAV), HPAV2, Bluetooth, Zigbee, Zwave, etc.). The access point 105 may create one or more virtual local area networks (VLAN) over a MoCA interface to correspond with service set identifiers (SSID) (e.g., private SSID, Ethernet, etc.) at the one or more network extenders 110. The access point 105 may maintain a record identifying device(s) associated with each of the one or more network extenders 110.

In embodiments, a determination may be made as to a channel impact from moving a station 115 to one or more of the access point 105 or network extender 110. The total impact of a station 115 as the station 115 is moved across the various link points (e.g., access point 105, network extenders 110), and by determining a total impact of moving the station 115 to each of the various link points, an optimal link point may be selected, wherein the optimal link point is the link point to which the station 115 may be moved at a minimal impact to the total channel capacity. Total channel capacity may include a channel capacity of a back-haul (BH) link and a channel capacity of a front-haul (FH) link.

In embodiments, the total channel impact of moving a station 115 to each respective one of one or more link points may be determined in order to ascertain whether each respective one link point is a candidate for connectivity with the station 115. Multiple channel impacts may be calculated and utilized to arrive at a final solution, depending upon the complexity and design of the deployed WLAN. The channel impacts may include the BH channel impact and the FH (serving channel) impact. Using the calculated channel impacts, one or more stations 115 may be selected for removal from a current link point due to a high channel impact at the current link point. Using the calculated channel impacts, one or more new link points to which a station 115 may be moved may be selected, wherein the selection of the one or more new link points may be made based upon a determination that moving the station 115 to a link point of the one or more new link points will lessen the channel impact of the station 115 on the overall network (e.g., the deployed WLAN). Using the calculated channel impacts, a determination may be made whether a new link point will overload either the BH or FH of a link point or the overall system (e.g., the deployed WLAN).

In embodiments, the access point 105 and network extenders 110 may communicate with each other over a wired BH link. A link rate for each of the access point 105 and network extenders 110 may or may not be identical, depending upon the wired technology and protocol utilized by the wired BH link. A BH link rate may be determined and tracked for each of the one or more network extenders 110. For each respective network extender 110, an assessment may be made as to the total BH link usage resulting from moving a station 115 to the respective network extender 110 and the BH link usage of the respective network extender 110 resulting from moving the station 115 to the respective network extender 110.

Table 1 provides parameter definitions for each parameter used in the following calculations.

TABLE 1

| | |
|---|---|
| $BH_L$ | Backhaul Link Rate (kilobits per second) Derived from current PHY characteristics of the BH link |
| $BH_U$ | Backhaul Utilization Includes all traffic traversing the BH channel over a period of time |
| $BH_I$ | Backhaul Channel Impact |
| $BH_T$ | Backhaul Channel Threshold |
| $FH_L$ | Fronthaul Link Rate (kilobits per second) |
| $FH_U$ | Fronthaul Current Utilization Includes all traffic traversing the FH channel over a period of time |
| $FH_I$ | Fronthaul Channel Impact |
| $FH_T$ | Fronthaul Channel Threshold |
| $STA_R$ | Data Rate of STA (kilobits per second) Calculated by averaging the Station Data Rate over a period of time. |
| h | Hop Count from the root device |
| p | Current Link Point-hops from the root |

Using Equation 1, for a BH channel comprising a wired link, a determination may be made whether total BH link usage resulting from moving a station 115 to a respective network extender 110 is less than total BH link throughput available.

$$(BH_U - BH_{I(p)} + BH_{I(h)}) < BH_T$$

Where
$BH_{I(h)} = STA_R / BH_{L(h)}$ at new Link Point (Extender) and $BH_{I(p)} = BH_I$ at the current Link Point (prior Extender).

EQUATION 1

Using Equation 2, for a BH channel comprising a wired link, a determination may be made whether BH link usage at a respective network extender 110 exceeds BH link throughput available as a result of adding a station 115 to the respective network extender 110.

For h=1 to k $$BH_{U(h)} + BH_{I(h)} < BH_T$$

EQUATION 2

In embodiments, an assessment may be made for a movement of a station 115 to each respective one of one or more network extenders 110 and/or radios associated with the network extenders 110. Using Equation 3, a determination may be made whether FH link impact resulting from moving a station 115 to a respective network extender 110 will cause FH link usage by the respective network extender 110 to exceed a FH channel threshold.

$$FH_{U(h,r)} + FH_{I(h,r)} < FH_{T(h,r)}$$

Where $$FH_{I(h,r)} = STA_R / FH_{L(h,r)}$$

and where $FH_L$ is known or estimated from other collected data.

EQUATION 3

In embodiments, where the BH channel to the network extenders 110 is a dedicated (not shared with the FH)

WLAN link, each individual link between the access point 105 and each respective network extender 110 may be evaluated to determine the link capacity with the additional channel impact of moving the station 115 to the respective link. Each hop link may be calculated separately in an impact matrix, thus if multiple hops are to be traversed, the impact for each hop may be assessed individually. The wireless BH link rates per hop ($BH_{L(h)}$) may be collected from the PHY statistics of each device relative to its neighboring link.

Using Equation 4, for a BH channel comprising a dedicated WLAN link, a total BH channel impact of moving the station 115 to each respective one of one or more network extenders 110 may be calculated, and a determination may be made whether the total BH channel impact exceeds a BH channel threshold.

$$BH_U - \sum_{h=1}^{p} BH_{Ih} + \sum_{h=1}^{h<=k} BH_{Ih} < BH_T \qquad \text{Equation 4}$$

Where $p$ = the current link point (hops from the root)

$h$ = hop count of the link being checked $k$ = the maximum hop count of the network $BH_U$ = Total Backhaul Utilization from root $BH_{Lh}$ = Link rate of the Backhaul hop $BH_{Ih}$ = STA Impact on the hop where $BH_{Ih} = STA_R / BH_{Lh}$ Using Equation 5, for a BH channel comprising a dedicated WLAN link, BH channel impact of the station 115 on each respective network extender 110 may be assessed, validating that, for each link segment between the respective network extender 110 and the access point 105, BH utilization does not exceed a BH threshold for the link, discounting any current channel impact of the station 115 on the link.

$BH_{U(h)} - (BH_{I(p)}|0) + BH_{I(h)} < BH_T$

Where $BH_{I(h)} = STA_R/BH_{L(h)}$ for each Extender available for selection.

For example—if evaluating an extender which is two hops away $(BH_{U(1)} + BH_{I(1)} < BH_T) \&\& (BH_{U(2)} + BH_{I(2)} < BH_T)$

EQUATION 5

In embodiments, where a BH channel comprises a dedicated WLAN link, FH channel impact of a station 115 may be assessed for each respective one of one or more network extenders 110 and/or radios using Equation 6.

$FH_{U(h)} + FH_{I(h,r)} < FH_T$

Where $FH_{I(h,r)} = STA_R/FH_{L(h,r)}$
and where $FH_L$ is known or estimated from other collected data.

EQUATION 6

In embodiments, where the BH channel comprises a shared wireless link with the FH, the BH channel impact calculation on a per extender basis may be calculated as a summation of the individual channel impacts per network extender 110 from the access point 105 and, depending on a FH link radio, adding this to the channel impact as well. The BH channel in a wireless repeater may reside on the highest bandwidth channels available. The FH channel may be any serving radio, however, it does not impact the BH if the FH radio is not the BH radio.

Using Equation 7, where the BH channel comprises a shared wireless link, a determination may be made whether total BH channel impact exceeds a BH threshold.

$$BH_U - (FH_{Ip}|0) - \sum_{h=1}^{p} BH_{Ih} + \sum_{h=1}^{h<=k} BH_{Ih} + (FH_{Ih}|0) < BH_T \qquad \text{Equation 7}$$

Where $p$ = the current link point (hops from the root)

$h$ = hop count of the link being checked $k$ = the maximum hop count of the network $BH_U$ = Total Backhaul Utilization $BH_{Lh}$ = Link rate of the Backhaul hop $BH_{Ih}$ = STA Impact on the hop where $BH_{Ih} = STA_R / BH_{Lh}$ The additional Channel Impact of the STA on the channel due to the FH will be:

$FH_{Ih} = STA_R / FH_{Lh}$ when the STA associates to the same radio as the Backhaul or Zero if the STA associates to a radio not identical to the Backhaul channel.

Using Equation 8, where the BH channel comprises a shared wireless link, an assessment of BH channel impact may be made for the addition of the station 115 on each of the one or more network extenders 110, and a determination may be made whether, for each link segment between each respective network extender 110 and the access point 105, BH utilization exceeds a BH threshold for the link, discounting any current channel impact of the station 115 on the link.

$BH_{U(h)} - (BH_{I(p)}|0) + BH_{I(h)} \leq BH_T$

Where $BH_{I(h)} = STA_R/BH_{L(h)}$ for each Extender available for selection.

For example—if evaluating an extender which is two hops away $(BH_{U(1)} + BH_{I(1)} < BH_T) \&\& (BH_{U(2)} + BH_{I(2)} < BH_T)$

EQUATION 8

Using Equation 9, where the BH channel comprises a shared wireless link, FH channel impact may be calculated.
In the case where the FH=BH, $FH_{Ih}$ has been imputed in the $BH_{Ih}$ calculation.
In the case where the FH!=BH, then $FH_I$ must be determined individually where:

$(FH_{U(h,r)} + FH_{I(h,r)}) < FH_T$ and $FH_{I(h,r)} = STA_R/FH_{L(h,r)}$

EQUATION 9

Figure 2:
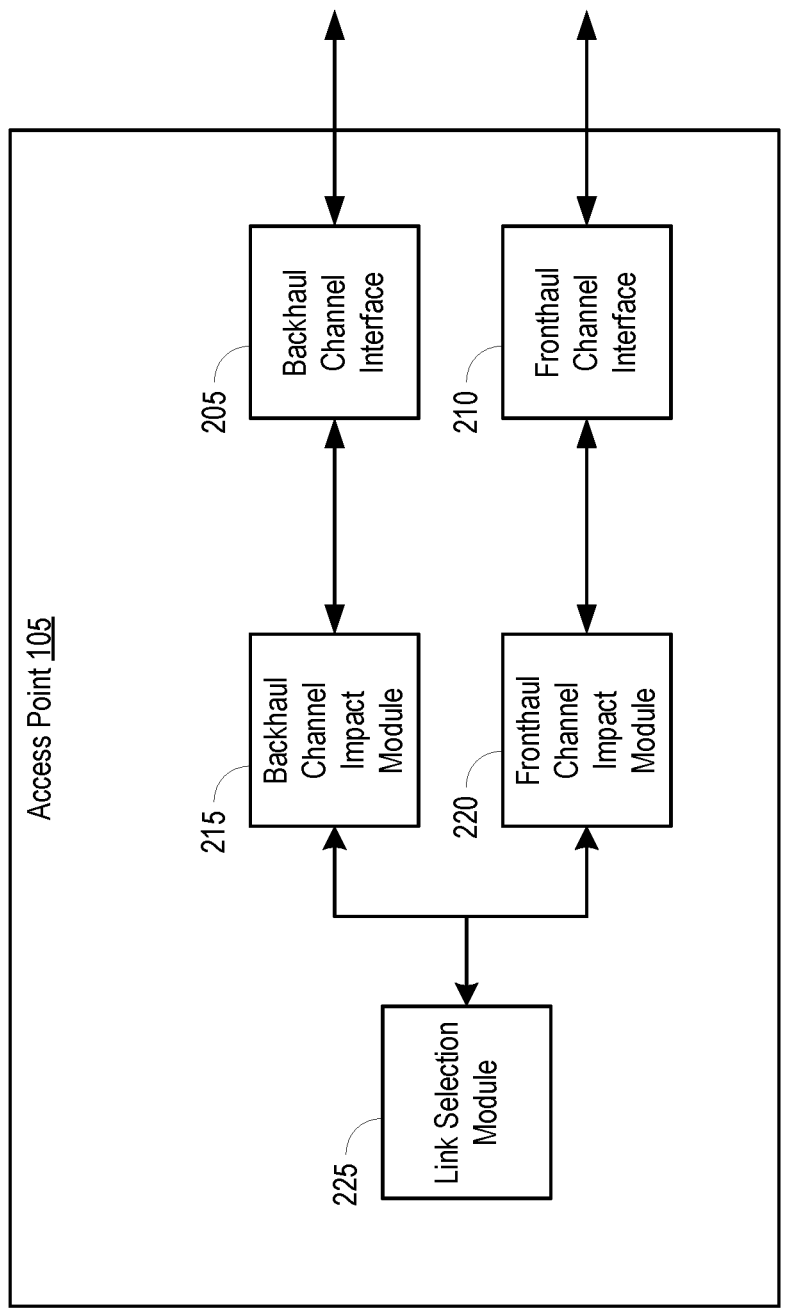
FIG. 2 is a block diagram illustrating an example access point operable to facilitate station steering based upon computed channel impact.

FIG. 2 is a block diagram illustrating an example access point 105 operable to facilitate station steering based upon computed channel impact. The access point 105 may include a backhaul channel interface 205, a fronthaul channel interface 210, a backhaul channel impact module 215, a fronthaul channel impact module 220, and a link selection module 225.

In embodiments, the access point 105 may pass communications to and may receive communications from one or more network extenders 110 (e.g., extenders, repeaters, etc.) over a BH channel via the backhaul channel interface 205. The BH channel may include a wired link, a dedicated wireless link, and/or a shared wireless link.

In embodiments, the access point 105 may pass communications to and may receive communications from one or more network extenders 110 and/or one or more stations 115 of FIG. 1 over a FH channel via the fronthaul channel interface 210.

In embodiments, for each respective one of one or more network extenders 110 the backhaul channel impact module 215 may calculate a BH channel impact of adding a station 115 to the respective network extender 110, and the backhaul channel impact module 215 may determine whether the BH channel impact causes the BH channel utilization at the respective network extender 110 to exceed a BH threshold, and the backhaul channel impact module 215 may further determine whether the BH channel impact causes a total BH channel utilization to exceed a BH channel threshold.

In embodiments, for each respective one of one or more network extenders 110 the fronthaul channel impact module 220 may calculate a FH channel impact of adding a station 115 to the respective network extender 110, and the fronthaul channel impact module 220 may determine whether the FH channel impact causes the FH channel utilization at the respective network extender 110 to exceed a FH threshold, and the fronthaul channel impact module 220 may further determine whether the FH channel impact causes a total FH channel utilization to exceed a FH channel threshold.

In embodiments, the link selection module 225 may identify a link point (e.g., access point 105, network extender 110, etc.) that is operating with a BH or FH channel impact which exceeds a threshold. The link selection module 225 may identify one or more stations 115 to be moved away from a link point due to a recognition of a high BH or FH channel impact at the link point. The link selection module 225 may identify the one or more stations 115 for removal from the link point based upon a calculation of the FH channel impact of the one or more stations 115 and/or the BH channel impact of the one or more stations 115. For example, the one or more stations 115 having the highest calculated FH and/or BH channel impact relative to each of one or more stations 115 that are associated with the link point may be selected for removal from the link point.

In embodiments, the link selection module 225 may select one or more new link points (e.g., access point 105, network extender 110, etc.) to which one or more stations 115 may be moved to lessen FH and/or BH channel impact at one or more link points. For example, using calculated FH and/or BH channel impacts of moving one or more stations 115 to one or more link points, the link selection module 225 may select the one or more link points having the lowest FH and/or BH channel impacts from an association with one or more stations 115.

In embodiments, the link selection module 225 may verify that new link points (e.g., access point 105, network extender 110, etc.) do not overload either the BH or FH of a link or the BH or FH channels of the overall system (e.g., the associated WLAN).

Figure 3:
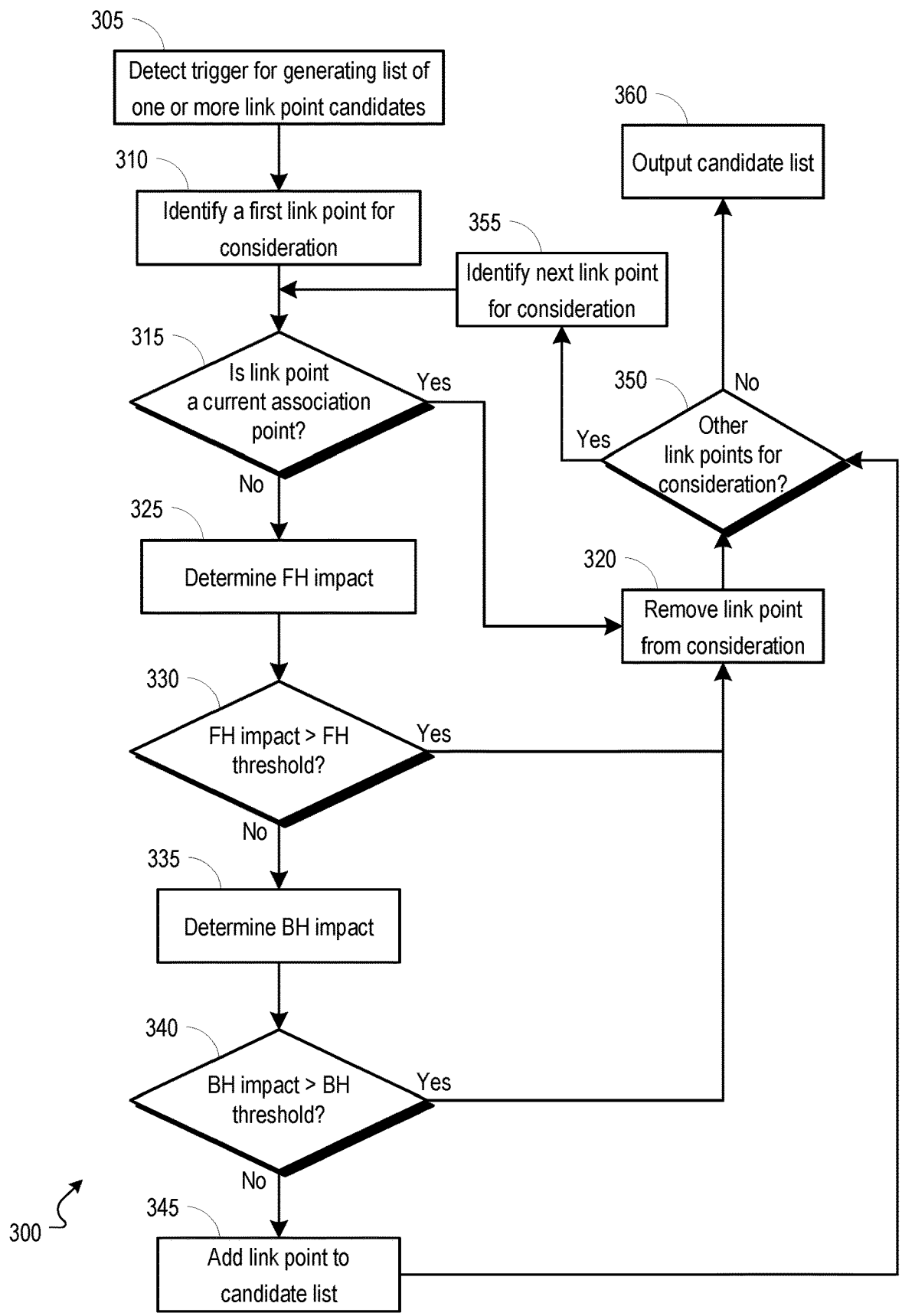
FIG. 3 is a flowchart illustrating an example process operable to facilitate a generation of a list of one or more link points to which a station may be steered.

FIG. 3 is a flowchart illustrating an example process 300 operable to facilitate a generation of a list of one or more link points to which a station may be steered. The process 300 may begin at 305 when a trigger for generating a list of one or more link point candidates is detected. The trigger for generating a list of one or more link point candidates may be detected, for example, by an access point 105 of FIG. 1. In embodiments, the trigger for generating a list of one or more link point candidates may include a determination or trigger that leads to an initiation of a search for one or more candidate link points (e.g., access point 105, network extender 110, etc.) to which one or more stations (e.g., stations 115 of FIG. 1) may be moved, wherein each of the one or more candidate link points are found to be capable of supporting the one or more stations without a FH or BH threshold being exceeded by FH or BH utilization.

At 310, a first link point for consideration may be identified. The first link point for consideration may be identified, for example, by the access point 105. In embodiments, the first link point for consideration may be identified from one or more link points (e.g., the access point 105, network extenders 110, etc.) that are available for associating with one or more stations 115. For example, the one or more link points available for consideration may include one or more stations associated with a WLAN that is supported by the access point 105.

At 315, a determination may be made whether the link point is a current association point for the station. The determination whether the link point is a current association point for the station (e.g., whether the station is currently associated with the link point being considered) may be made, for example, by the access point 105. If the link point is a current association point for the station, the link point may be removed from consideration at 320.

If, at 315, the determination is made that the link point is not a current association point for the station, the process 300 may proceed to 325. At 325, a FH impact of moving the station to the link point may be determined. The FH impact of moving the station to the link point under consideration may be determined, for example, by the access point 105 (e.g., by a fronthaul channel impact module 220 of FIG. 2). In embodiments, the FH impact that is determined may include a calculation of a FH impact on the link point and/or a FH impact on a FH channel associated with the WLAN. It will be appreciated that the FH impact may be calculated according to the one or more Equations presented above (e.g., Equations 1-9) and the one or more Equations used may be based upon whether the BH channel associated with the WLAN is a wired link, a dedicated wireless link, or a shared wireless link.

At 330, a determination may be made whether the calculated FH impact (e.g., the FH impact determined at 325) is greater than a FH threshold. The determination whether the calculated FH impact is greater than a FH threshold may be made, for example, by the access point 105. In embodiments, the calculated FH impact may be compared to a FH threshold that is associated with the link point and/or the FH channel. If the determination is made that the calculated FH impact is greater than a FH threshold, the link point may be removed from consideration at 320.

If, at 330, the determination is made that the calculated FH impact is not greater than a FH threshold, the process 300 may proceed to 335. At 335, a BH impact of moving the station to the link point may be determined. The BH impact of moving the station to the link point under consideration may be determined, for example, by the access point 105 (e.g., by a backhaul channel impact module 215 of FIG. 2). In embodiments, the BH impact that is determined may include a calculation of a BH impact on the link point and/or a BH impact on a BH channel associated with the WLAN. It will be appreciated that the BH impact may be calculated according to the one or more Equations presented above (e.g., Equations 1-9) and the one or more Equations used may be based upon whether the BH channel associated with the WLAN is a wired link, a dedicated wireless link, or a shared wireless link.

At 340, a determination may be made whether the calculated BH impact (e.g., the BH impact determined at 335) is greater than a BH threshold. The determination whether the calculated BH impact is greater than a BH threshold may be made, for example, by the access point 105. In embodiments, the calculated BH impact may be compared to a BH threshold that is associated with the link point and/or the BH channel. If the determination is made that the calculated BH impact is greater than a BH threshold, the link point may be removed from consideration at 320.

If, at 340, the determination is made that the calculated BH impact is not greater than a BH threshold, the process 300 may proceed to 345. At 345, the link point under consideration may be added to a link point candidate list. The link point may be added to a candidate list, for example, by the access point 105 (e.g., a link selection module 225 of FIG. 2). In embodiments, the link point candidate list may be maintained by the link selection module 225.

At 350, a determination may be made whether one or more other link points are available for consideration. The determination whether one or more other link points are available for consideration may be made, for example, by the access point 105. In embodiments, the access point 105 may determine whether one or more other link points (e.g., link points within the WLAN) which have not yet been considered for inclusion in the candidate list are available for associating with the station.

If, at 350, the determination is made that one or more other link points are available for consideration, a next link point may be identified for consideration at 355, and the next link point may be considered for inclusion in the link point candidate list.

If, at 350, the determination is made that no other link points are available for consideration, the process 300 may proceed to 360. At 360, the link point candidate list may be output. In embodiments, the link point candidate list may be output to a link point, to a station, to a user, and/or others. The link point candidate list may include identification and/or configuration information associated with one or more link points to which a station may be moved. Using the link point candidate list, a link point may be selected from the candidate list, and a station may be steered to the selected link point. For example, the link selection module 225 may select a link point from the link point candidate list and may initiate a steering of a station to the selected link point.

Figure 4:
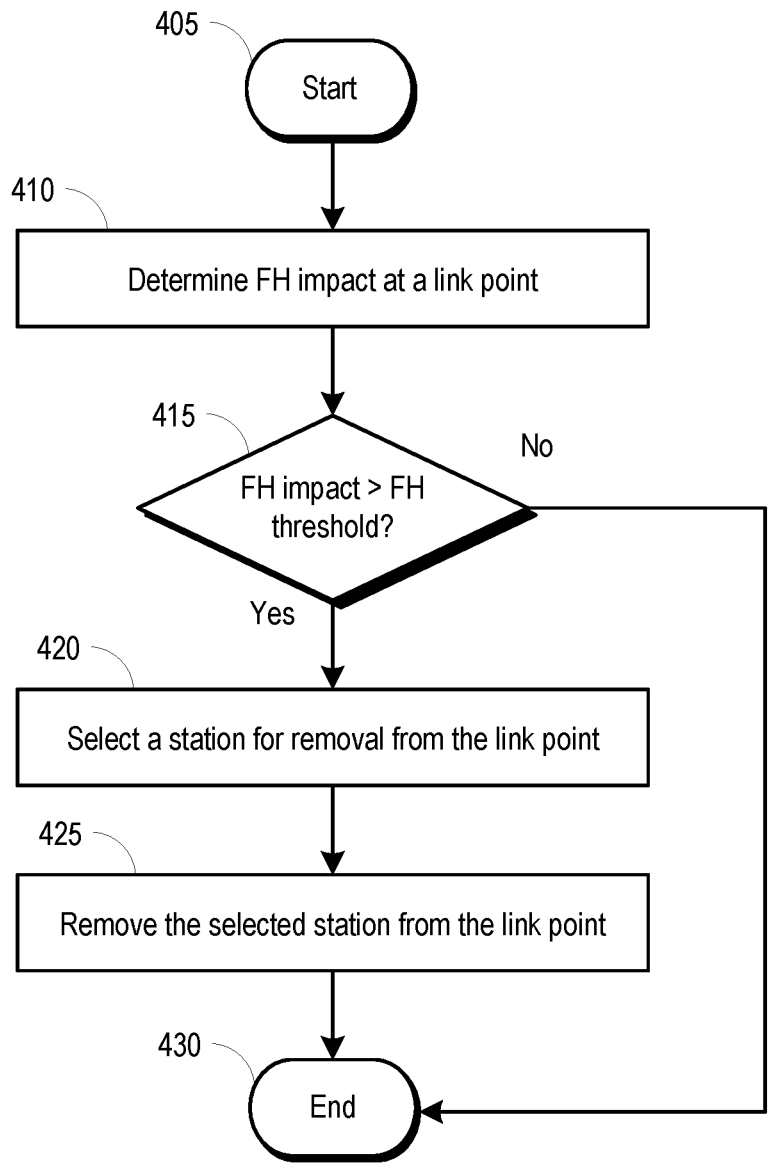
FIG. 4 is a flowchart illustrating an example process operable to facilitate a removal of a station from a link point based upon a determination that a FH impact at the link point exceeds a FH threshold.

FIG. 4 is a flowchart illustrating an example process 400 operable to facilitate a removal of a station from a link point based upon a determination that a FH impact at the link point exceeds a FH threshold. The process 400 may be carried out by an access point 105 and may begin at 405. The process 400 may be carried out periodically across a WLAN associated with an access point 105 or the process 400 may be initiated in response to a change occurring in the WLAN.

At 410, a FH impact at a link point may be determined. The FH impact at a link point (e.g., an access device 105, network extender 110, etc.) may be determined, for example, by the access point 105 (e.g., by a fronthaul channel impact module 220 of FIG. 2). In embodiments, the FH impact that is determined may include a calculation of a FH impact on the link point and/or a FH impact on a FH channel associated with the WLAN. It will be appreciated that the FH impact may be calculated according to the one or more Equations presented above (e.g., Equations 1-9) and the one or more Equations used may be based upon whether the BH channel associated with the WLAN is a wired link, a dedicated wireless link, or a shared wireless link.

At 415, a determination may be made whether the calculated FH impact (e.g., the FH impact determined at 410) is greater than a FH threshold. The determination whether the calculated FH impact is greater than a FH threshold may be made, for example, by the access point 105. In embodiments, the calculated FH impact may be compared to a FH threshold that is associated with the link point and/or the FH channel.

If, at 415, the determination is made that the calculated FH impact is greater than a FH threshold, the process 400 may proceed to 420. At 420, a station may be selected for removal from the link point. The station may be selected, for example, by the access point 105 (e.g., by a link selection module 225 of FIG. 2). In embodiments, the station may be selected based upon a calculation of FH impact of each of one or more stations that are associated with the link point. For example, the station selected for removal from the link point may be the station having the highest FH impact relative to the FH impact of one or more other stations that are associated with the link point.

At 425, the selected station may be removed from the link point. In embodiments, the selected station may be removed from the link point and steered to another link point within the WLAN. For example, the station may be steered to a certain link point based upon one or more calculations of FH and/or BH impact of moving the station to one or more link points.

Returning to 415, if the determination is made that FH impact is not greater than a FH threshold, the process 400 may end at 430. It should be understood that after the process 400 ends, a next link point within the WLAN associated with the access device 105 may be identified, and one or more stations may be removed from the next link point based upon the FH impact considerations of the process 400.

Figure 5:
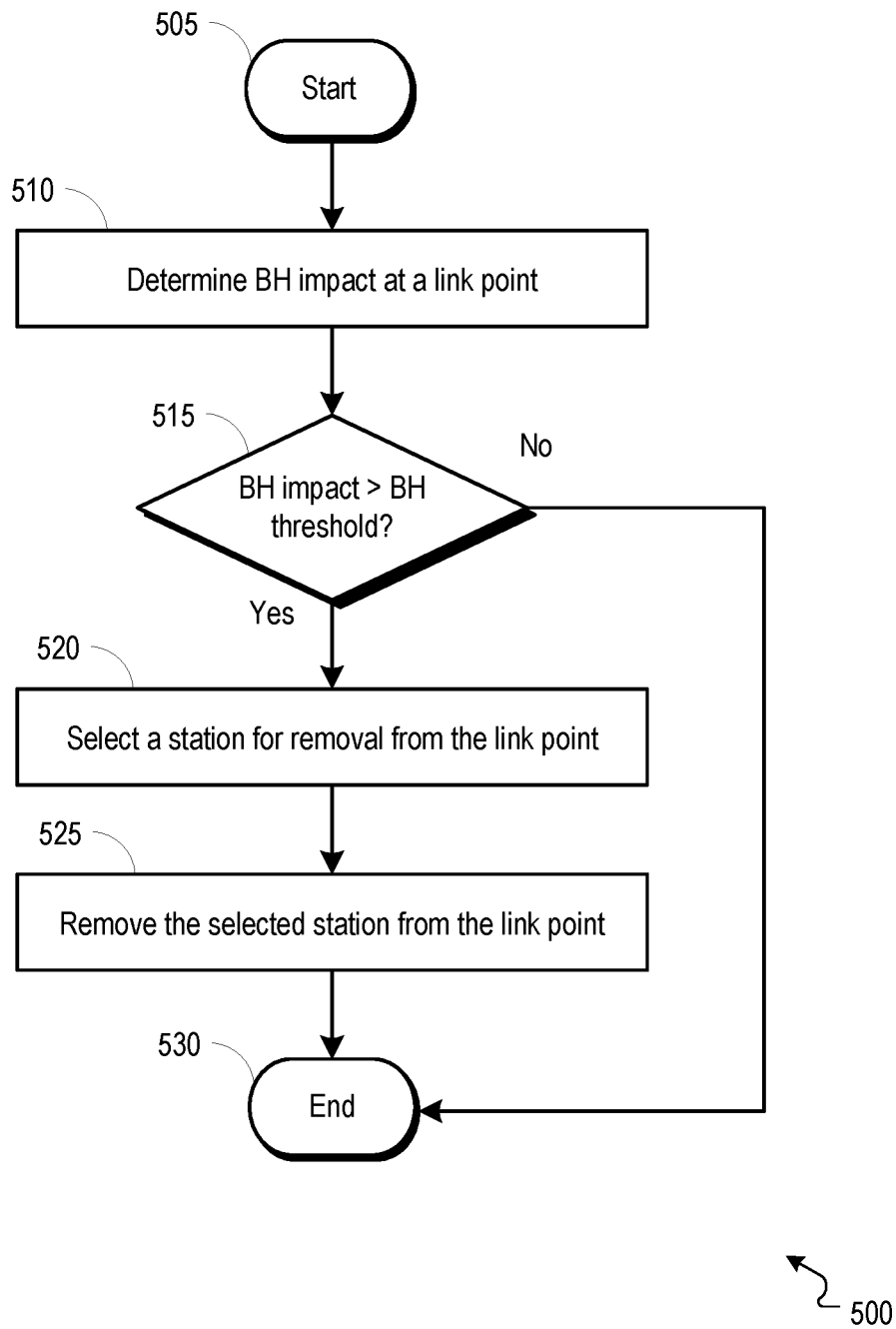
FIG. 5 is a flowchart illustrating an example process operable to facilitate a removal of a station from a link point based upon a determination that a BH impact at the link point exceeds a BH threshold.

FIG. 5 is a flowchart illustrating an example process 500 operable to facilitate a removal of a station from a link point based upon a determination that a BH impact at the link point exceeds a BH threshold. The process 500 may be carried out by an access point 105 and may begin at 505. The process 500 may be carried out periodically across a WLAN associated with an access point 105 or the process 500 may be initiated in response to a change occurring in the WLAN.

At 510, a BH impact at a link point may be determined. The BH impact at a link point (e.g., an access device 105, network extender 110, etc.) may be determined, for example, by the access point 105 (e.g., by a backhaul channel impact module 215 of FIG. 2). In embodiments, the BH impact that is determined may include a calculation of a BH impact on the link point and/or a BH impact on a BH channel associated with the WLAN. It will be appreciated that the BH impact may be calculated according to the one or more Equations presented above (e.g., Equations 1-9) and the one or more Equations used may be based upon whether the BH channel associated with the WLAN is a wired link, a dedicated wireless link, or a shared wireless link.

At 515, a determination may be made whether the calculated BH impact (e.g., the BH impact determined at 510) is greater than a BH threshold. The determination whether the calculated BH impact is greater than a BH threshold may be made, for example, by the access point 105. In embodiments, the calculated BH impact may be compared to a BH threshold that is associated with the link point and/or the BH channel.

If, at 515, the determination is made that the calculated BH impact is greater than a BH threshold, the process 500 may proceed to 520. At 520, a station may be selected for removal from the link point. The station may be selected, for example, by the access point 105 (e.g., by a link selection module 225 of FIG. 2). In embodiments, the station may be selected based upon a calculation of BH impact of each of one or more stations that are associated with the link point. For example, the station selected for removal from the link point may be the station having the highest BH impact relative to the BH impact of one or more other stations that are associated with the link point.

At 525, the selected station may be removed from the link point. In embodiments, the selected station may be removed from the link point and steered to another link point within the WLAN. For example, the station may be steered to a certain link point based upon one or more calculations of FH and/or BH impact of moving the station to one or more link points.

Returning to 515, if the determination is made that BH impact is not greater than a BH threshold, the process 500 may end at 530. It should be understood that after the process 500 ends, a next link point within the WLAN associated with the access device 105 may be identified, and one or more stations may be removed from the next link point based upon the BH impact considerations of the process 500.

Figure 6:
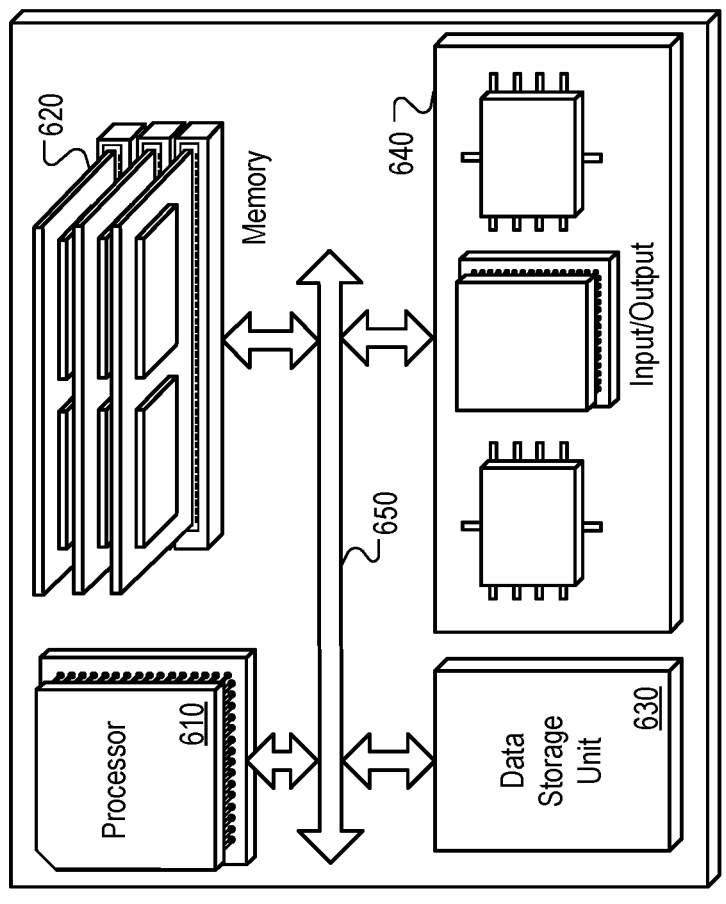
FIG. 6 is a block diagram of a hardware configuration operable to facilitate station steering based upon computed channel impact.

FIG. 6 is a block diagram of a hardware configuration 600 operable to facilitate station steering based upon computed channel impact. It should be understood that the hardware configuration 600 can exist in various types of devices. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 640 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more devices within a subscriber premise (e.g., access point 105 of FIG. 1, station 115 of FIG. 1, network extender 110 of FIG. 1, etc.) and/or one or more networks (e.g., subscriber network 125 of FIG. 1, WAN 120 of FIG. 1, local network, etc.).

Those skilled in the art will appreciate that the invention improves upon methods and apparatuses for steering a station between one or more link points. Methods, systems, and computer readable media may be operable to facilitate station steering based upon computed channel impact. A channel impact of moving a station to one or more different link points within a WLAN may be calculated, and based upon the calculated channel impacts, the station may be steered to a certain link point. Using the calculated channel impacts, one or more stations may be selected for removal from an overloaded link point, a new link point may be selected for association with a station, and a determination may be made whether other WLAN changes may cause a backhaul or fronthaul channel utilization to exceed a corresponding threshold.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    identifying one or more link points from a list comprising one or more link points of a local area network (LAN) that are available for associating with a station;
    for each respective one of the one or more identified link points:
        determining a fronthaul channel impact of associating the station with the respective link point, wherein the fronthaul channel impact includes at least one of a per link fronthaul channel utilization at the respective link point and a total fronthaul channel utilization of a fronthaul channel associated with the LAN that would result from moving the station to the respective link point;
        determining a backhaul channel impact of associating the station with the respective link point, wherein the backhaul channel impact includes at least one of a per link backhaul channel utilization at the respective link point and a total backhaul channel utilization of a backhaul channel associated with the LAN that would result from moving the station to the respective link point;
        when the fronthaul channel impact of associating the station with the respective link point is greater than a fronthaul threshold, removing the respective link point from the list;
        when the backhaul channel impact of associating the station with the respective link point is greater than a backhaul threshold, removing the respective link point from the list; and
        when the fronthaul channel impact of associating the station with the respective link point is less than the fronthaul threshold, and the backhaul channel impact of associating the station with the respective link point is less than the backhaul threshold, adding the respective link point to a candidate list comprising one or more link point candidates with which the station may be associated from among the one or more identified link points; and
    outputting the candidate list.

2. The method of claim 1, wherein the fronthaul channel impact of associating the station with the respective link point comprises a fronthaul channel impact at the respective link point.

3. The method of claim 1, wherein the backhaul channel impact of associating the station with the respective link point comprises a backhaul channel impact at the respective link point.

4. The method of claim 1, wherein the fronthaul channel impact of associating the station with the respective link point comprises a fronthaul channel impact at a fronthaul channel associated with the one or more link points that are available for associating with the station.

5. The method of claim 1, wherein the backhaul channel impact of associating the station with the respective link point comprises a backhaul channel impact at a backhaul channel associated with the one or more link points that are available for associating with the station.

6. The method of claim 1, further comprising:
    selecting a link point, from among the one or more link point candidates in the candidate list, to which moving the station will minimize or reduce at least one of the fronthaul channel impact and the backhaul channel impact of the station on the LAN; and
    steering the station to the selected link point.

7. The method of claim 1, wherein the one or more link points are identified in response to a removal of the station from an overloaded link point of the LAN.

8. An apparatus comprising:
    a memory storing computer-readable instructions; and
    a processor configured to execute the computer-readable instructions to:

identify one or more link points from a list comprising one or more link points of a local area network (LAN) that are available for associating with a station;

for each respective one of the one or more identified link points:

determine a fronthaul channel impact of associating the station with the respective link point, wherein the fronthaul channel impact includes at least one of a per link fronthaul channel utilization at the respective link point and a total fronthaul channel utilization of a fronthaul channel associated with the LAN that would result from moving the station to the respective link point;

determine a backhaul channel impact of associating the station with the respective link point, wherein the backhaul channel impact includes at least one of a per link backhaul channel utilization at the respective link point and a total backhaul channel utilization of a backhaul channel associated with the LAN that would result from moving the station to the respective link point;

when the fronthaul channel impact of associating the station with the respective link point is greater than a fronthaul threshold, removing the respective link point from the list;

when the backhaul channel impact of associating the station with the respective link point is greater than a backhaul threshold, remove the respective link point from the list; and when the fronthaul channel impact of associating the station with the respective link point is less than the fronthaul threshold, and the backhaul channel impact of associating the station with the respective link point is less than the backhaul threshold, add the respective link point to a candidate list, comprising one or more link point candidates with which the station may be associated from among the one or more identified link points; and output the candidate list.

9. The apparatus of claim 8, wherein the fronthaul channel impact of associating the station with the respective link point comprises a fronthaul channel impact at the respective link point.

10. The apparatus of claim 8, wherein the backhaul channel impact of associating the station with the respective link point comprises a backhaul channel impact at the respective link point.

11. The apparatus of claim 8, wherein the fronthaul channel impact of associating the station with the respective link point comprises a fronthaul channel impact at a fronthaul channel associated with the one or more link points that are available for associating with the station.

12. The apparatus of claim 8, wherein the backhaul channel impact of associating the station with the respective link point comprises a backhaul channel impact at a backhaul channel associated with the one or more link points that are available for associating with the station.

13. The apparatus of claim 8, wherein the processor is further configured to execute the computer-readable instructions to:

select a link point, from among the one or more link point candidates in the candidate list, to which moving the station will minimize or reduce at least one of the fronthaul channel impact and the backhaul channel impact of the station on the LAN; and steer the station to the selected link point.

14. One or more non-transitory computer readable media having instructions operable to cause one or more processors to perform operations comprising:

identifying one or more link points from a list comprising one or more link points of a local area network (LAN) that are available for associating with a station;

for each respective one of the one or more identified link points:

determining a fronthaul channel impact of associating the station with the respective link point, wherein the fronthaul channel impact includes at least one of a per link fronthaul channel utilization at the respective link point and a total fronthaul channel utilization of a fronthaul channel associated with the LAN that would result from moving the station to the respective link point;

determining a backhaul channel impact of associating the station with the respective link point, wherein the backhaul channel impact includes at least one of a per link backhaul channel utilization at the respective link point and a total backhaul channel utilization of a backhaul channel associated with the LAN that would result from moving the station to the respective link point;

when the fronthaul channel impact of associating the station with the respective link point is greater than a fronthaul threshold, removing the respective link point from the list;

when the backhaul channel impact of associating the station with the respective link point is greater than a backhaul threshold, removing the respective link point from the list; and when the fronthaul channel impact of associating the station with the respective link point is less than the fronthaul threshold, and the backhaul channel impact of associating the station with the respective link point is less than the backhaul threshold, adding the respective link point to a candidate list comprising one or more link point candidates with which the station may be associated from among the one or more identified link points; and outputting the candidate list.

15. The one or more non-transitory computer-readable media of claim 14, wherein the fronthaul channel impact of associating the station with the respective link point comprises a fronthaul channel impact at the respective link point.

16. The one or more non-transitory computer-readable media of claim 14, wherein the backhaul channel impact of associating the station with the respective link point comprises a backhaul channel impact at the respective link point.

17. The one or more non-transitory computer-readable media of claim 14, wherein the fronthaul channel impact of associating the station with the respective link point comprises a fronthaul channel impact at a fronthaul channel associated with the one or more link points that are available for associating with the station.

18. The one or more non-transitory computer-readable media of claim 14, wherein the backhaul channel impact of associating the station with the respective link point comprises a backhaul channel impact at a backhaul channel associated with the one or more link points that are available for associating with the station.

19. The one or more non-transitory computer-readable media of claim 14, wherein the instructions are further operable to cause the one or more processors to perform operations comprising:

selecting a link point, from among the one or more link point candidates in the candidate list, to which moving the station will minimize or reduce at least one of the fronthaul channel impact and the backhaul channel impact of the station on the LAN; and steering the station to the selected link point.

20. The one or more non-transitory computer-readable media of claim 14, wherein the one or more link points are identified in response to a removal of the station from an overloaded link point of the LAN.

* * * * *